Patented May 26, 1953

2,639,808

UNITED STATES PATENT OFFICE 2,639,808

PACKAGING OF TACKY MATERIALS

Arthur W. Barry, Charleston, W. Va., and Franklin S. Chance, Jr., Wilmington, Del., assignors to E. I. du Pont de Nemours & Company, Wilmington, Del., a corporation of Delaware No Drawing. Application March 13, 1947, Serial No. 734,562

1 Claim. (Cl. 206—84)

This invention relates to a process for the packaging of tacky materials and to masses of tacky materials prepared and packaged according to this process.

Tacky materials present a considerable packaging problem. Since they adhere to almost any surface, it is very difficult to remove them from containers in which they are shipped. If paper bags are used, the paper sticks to the tacky material and tears when the material is being removed therefrom. If more rigid containers are used, the material must either be laboriously scraped from the sides of the containers or else special and involved procedures must be employed. Moreover, the use of rigid containers for shipment is expensive.

It is an object of this invention to overcome these difficulties by providing an improved method for packaging tacky materials. Another object of this invention is to provide an improved method for packaging tacky materials in containers. A further object of the invention is to provide masses of tacky materials which have been prepared for shipment or packaged in containers according to this improved method. Other objects of the invention will appear hereinafter.

According to this invention, tacky or gummy materials are packaged by enveloping a mass of the tacky material in a flexible, solid film of non-tacky, compatible material, i. e. a non-tacky material which can be thoroughly admixed with the tacky material by the use of a common solvent, by the action of heat, or by mechanical working in a rubber mill. The non-tacky film serves to prevent any adherence of the tacky material to the surface of a container or other object, yet, since it is compatible with the tacky material, the whole package can be handled in subsequent processing equipment without any necessity for separating the film from the tacky material. For example, if the tacky material is polyisobutylene, and the non-tacky film is a normally solid polyethylene, the entire package can be subjected to mechanical working in a rubber mill and a homogeneous product suitable for use as a rubber additive, etc. is thus obtained.

The process of the invention may be carried out by employing a preformed film or by forming the film directly on the surface of the tacky material. In the latter case, the film-forming composition may be applied as a spray or by means of a dipping process, using either a melt or a suitable solution of the non-tacky material. If a preformed film is to be employed, it may be fabricated in any desired shape. In cases where it is proposed to employ a container, it may be desirable to fabricate a film conforming approximately to the dimensions of the container, and then to envelop the tacky material in this film and place the package in the container. Another procedure involves preforming the film directly on the inner surface of a container and thereafter introducing the tacky material. A preferred embodiment of the invention involves the use of a film of extensible material, i. e. material which may be stretched or cold-drawn, films of this type having the advantage of permitting the tacky material to be pressed into a shape which will fit into a variety of containers or storage places. It will be understood that, according to the invention, the use of a container is optional, and if a container is used, it is intended that the film will eventually be removed therefrom and processed along with the tacky material. The invention is in no way concerned with coatings or films designed to adhere permanently to the inner surfaces of the container.

There are numerous tacky materials to which the packaging process of this invention is applicable. For instance, the material resulting from the interpolymerization of ethylene with vinyl acetate in the mol ratio of about 3:1, or 2:1, or less, is a decidedly tacky gelatinous polymer, and at room temperature it will adhere to almost any surface. This material may be packaged by enveloping it in a thin film of polyethylene or in a thin film of the interpolymer of ethylene with vinyl acetate in the mol ratio of at least 6:1, either of these films being non-tacky as well as extensible. The bulk material may then be placed in or removed from a bag or other container without adhering to the surface. Since either of these films is compatible with the tacky ethylene/vinyl acetate interpolymer in the low ratios of film to tacky material, the mass can subsequently be handled in mixers, or mechanical working equipment, or other processing equipment without appreciably altering the properties of the tacky material.

Other tacky materials which may be packaged advantageously in films of polyethylene or in films of non-tacky ethylene/vinyl acetate interpolymers include, for example, polyisobutylene, polyvinyl ethers, polyvinyl esters, chlorinated polyethylene, chlorosulfonated polyethylene, soft acrylate and methacrylate polymers, natural rubber, synthetic rubber and many others. A further application of this invention involves the use of a non-tacky chlorinated polyethylene film in the packaging of plasticized tacky vinyl chloride polymers. Many other combinations of non-tacky films with tacky materials will occur immediately to those skilled in the art, such as, for example, the use of polystyrene or polyvinylidene chloride films for the packaging of a wide variety of tacky materials. It should be observed that the chlorinated and chlorosulfonated polyethylenes referred to above are generally of a tacky nature when their chlorine contents are about 20% to about 40 or 45% by weight, while those having chlorine contents outside of this range are generally non-tacky.

As used herein, the expression "polyethylene" relates to the normally solid materials resulting from the polymerization of ethylene alone, whereas the expressions "ethylene polymer" and "isobutylene polymer" also include the interpolymers, respectively, of ethylene and of isobutylene with other polymerizable compounds.

The process of this invention may be applied to any tacky material, whether natural or synthetic, the only limitation being that it must be possible to provide a non-tacky film which is flexible and moderately strong, and which is compatible with the tacky material. The invention finds its greatest usefulness in those instances where the subsequent admixture of the film with the tacky material does not appreciably alter the original properties of the tacky material or else does not affect these properties adversely. Frequently, the most suitable non-tacky films are those prepared from materials closely related to the particular tacky materials. For instance, polyethylene is considered to be closely related to the interpolymers of ethyelene. In other cases, however, as in the packaging of tacky or plasticized rubber, while the process of the invention may be carried out advantageously by employing a film of closely related material such as cured rubber, nevertheless under certain circumstances a film of polyethylene is to be preferred because of its attractive properties of high mechanical strength, light weight, flexibility, moisture proofness, and chemical inertness.

The thickness of the film employed depends, among other things, upon the inherent characteristics of the non-tacky material, such as its strength and flexibility, and upon the size of the packaging unit and the nature of the support or outer cover which may be employed. The film should be thick enough and strong enough so that it will not rupture under the conditions of handling to be encountered. There may be advantages in using as thin a film as is practical, so as to minimize any subsequent alterations in the properties of the tacky material. On the other hand, in certain instances, it may be desirable to employ a film which is strong enough to permit extensive handling of the mass, or even shipment thereof, without the necessity of providing any supplemental container.

The non-tacky film may be placed about the tacky material, for instance, by folding, or by heat-sealing the film, or by tying with a string which may advantageously be made of the same material as the film. If desired, a bag of non-tacky film containing the tacky material may be tied or sealed while applying a vacuum thereto, thus removing the air from within the bag and drawing the film tightly and compactly over the tacky material. Labels may be applied to the packages or printed on the films by several satisfactory methods.

Any suitable container may be used as an exterior support for the product obtained in the practice of this invention. Paper or cloth bags have the particular advantages of low cost and ease of handling both before and after use, but other containers are also within the scope of the invention. If desired, two or more packages may be placed in one container.

It will be understood that fillers, extenders, coloring materials, plasticizers, softeners, and the like may be added to either the tacky material or the non-tacky film. In preparing the tacky composition, it may sometimes be advantageous to take into consideration the fact that the non-tacky packaging film and any plasticizers, etc., contained therein, will eventually become a part of the final material.

Among the advantages of this invention are the fact that it greatly simplifies the packaging of tacky materials without appreciably altering their properties, the fact that it makes possible the use of convenient and low-cost containers such as paper bags, cloth bags, or other types of containers, and the fact that in many instances it completely eliminates the need for containers.

Since many modifications and adaptations of this invention will occur to those skilled in the art, it is not intended that the spirit and scope of the invention should be limited in any way other than as set forth in the claim appended hereto.

We claim:

A tacky, chloro-sulfonated polyethyylene enveloped in a thin, solid, non-tacky film of the interpolymers of ethylene with vinyl acetate in which the mol ratio of ethylene to vinyl acetate is at least 6:1.

ARTHUR W. BARRY.
FRANKLIN S. CHANCE, Jr.

References Cited in the file of this patent

UNITED STATES PATENTS

| Number | Name | Date |
|---|---|---|
| 619,810 | Upham | Feb. 21, 1899 |
| 931,350 | Thoma | Aug. 17, 1909 |
| 1,056,010 | Dailey | Mar. 18, 1913 |
| 1,607,626 | Hopkinson | Nov. 23, 1926 |
| 2,310,712 | Schmied | Feb. 9, 1943 |
| 2,332,373 | Dorough et al. | Oct. 19, 1943 |
| 2,352,865 | Smith | July 4, 1944 |
| 2,394,616 | Knoth et al. | Feb. 12, 1946 |
| 2,396,633 | Bernstein | Mar. 19, 1946 |
| 2,403,964 | Bannon et al. | July 16, 1946 |
| 2,572,959 | Sparks et al. | Oct. 30, 1951 |

FOREIGN PATENTS

| Number | Country | Date |
|---|---|---|
| 567,360 | Great Britain | Feb. 12, 1945 |